(12) United States Patent
Lofthus et al.

(10) Patent No.: US 7,787,138 B2
(45) Date of Patent: Aug. 31, 2010

(54) SCHEDULING SYSTEM

(75) Inventors: Robert M. Lofthus, Webster, NY (US);
Kristine A. German, Webster, NY (US);
Yongsoon Eun, Webster, NY (US); **Eric
S. Hamby**, Fairport, NY (US)

(73) Assignee: Xerox Corporation, Norwalk, CT (US)

( * ) Notice: Subject to any disclaimer, the term of this
patent is extended or adjusted under 35
U.S.C. 154(b) by 1469 days.

(21) Appl. No.: 11/137,251

(22) Filed: May 25, 2005

(65) Prior Publication Data
US 2006/0268317 A1 Nov. 30, 2006

(51) Int. Cl.
G06F 3/12 (2006.01)
G03G 15/00 (2006.01)

(52) U.S. Cl. .................. 358/1.15; 358/1.9; 358/1.13;
358/1.14; 399/82

(58) Field of Classification Search .................. 358/1.1,
358/1.9, 1.15, 2.1, 1.14; 399/82, 87, 382;
710/39, 40, 52
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,095,369 A | 3/1992 | Ortiz et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,287,194 A * | 2/1994 | Lobiondo | 358/1.15 |
| 5,326,093 A | 7/1994 | Sollitt | |
| 5,435,544 A | 7/1995 | Mandel | |
| 5,467,434 A * | 11/1995 | Hower et al. | 358/1.15 |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

Primary Examiner—Twyler L Haskins
Assistant Examiner—Dennis Dicker
(74) Attorney, Agent, or Firm—Fay Sharpe LLP

(57) ABSTRACT

A system suited to scheduling print jobs for a printing system includes a first processing component which identifies preliminary attributes of print jobs to be printed on sheets. A job scheduler receives the preliminary attributes and assigns each of the print jobs to one of a plurality of job queues in time order for printing. Print jobs spanning the same time are scheduled for printing contemporaneously. In one mode of operation, the assignment of the print jobs to the job queues is based on their preliminary attributes and on the application of at least one constraint which affects contemporaneous printing of at least two of the plurality of print jobs. A second processing component identifies detailed attributes of the print jobs. A sheet scheduler receives information on the assignments of the print jobs and their detailed attributes and forms an itinerary for each sheet to be printed.

14 Claims, 6 Drawing Sheets

U.S. PATENT DOCUMENTS

| | | | |
|---|---|---|---|
| 5,557,367 A | | 9/1996 | Yang et al. |
| 5,559,933 A * | | 9/1996 | Boswell ............... 358/1.15 |
| 5,568,246 A | | 10/1996 | Keller et al. |
| 5,570,172 A | | 10/1996 | Acquaviva |
| 5,596,416 A | | 1/1997 | Barry et al. |
| 5,617,214 A * | | 4/1997 | Webster et al. ............ 358/1.15 |
| 5,629,762 A | | 5/1997 | Mahoney et al. |
| 5,696,893 A | | 12/1997 | Fromherz et al. |
| 5,701,557 A | | 12/1997 | Webster et al. |
| 5,710,968 A | | 1/1998 | Clark et al. |
| 5,778,377 A | | 7/1998 | Marlin et al. |
| 5,884,910 A | | 3/1999 | Mandel |
| 5,978,560 A * | | 11/1999 | Tan et al. ................. 358/1.15 |
| 5,995,721 A | | 11/1999 | Rourke et al. |
| 6,059,284 A | | 5/2000 | Wolf et al. |
| 6,125,248 A | | 9/2000 | Moser |
| 6,241,242 B1 | | 6/2001 | Munro |
| 6,297,886 B1 | | 10/2001 | Cornell |
| 6,341,773 B1 | | 1/2002 | Aprato et al. |
| 6,384,918 B1 | | 5/2002 | Hubble, III et al. |
| 6,450,711 B1 | | 9/2002 | Conrow |
| 6,476,376 B1 | | 11/2002 | Biegelsen et al. |
| 6,476,923 B1 | | 11/2002 | Cornell |
| 6,493,098 B1 | | 12/2002 | Cornell |
| 6,537,910 B1 | | 3/2003 | Burke et al. |
| 6,550,762 B2 | | 4/2003 | Stoll |
| 6,554,276 B2 | | 4/2003 | Jackson et al. |
| 6,577,925 B1 | | 6/2003 | Fromherz |
| 6,607,320 B2 | | 8/2003 | Bobrow et al. |
| 6,608,988 B2 | | 8/2003 | Conrow |
| 6,612,566 B2 | | 9/2003 | Stoll |
| 6,612,571 B2 | | 9/2003 | Rider |
| 6,621,576 B2 | | 9/2003 | Tandon et al. |
| 6,633,382 B2 | | 10/2003 | Hubble, III et al. |
| 6,639,669 B2 | | 10/2003 | Hubble, III et al. |
| 6,687,018 B1 * | | 2/2004 | Leong et al. ............ 358/1.15 |
| 6,819,445 B1 | | 11/2004 | Stevenson et al. |
| 6,819,906 B1 | | 11/2004 | Herrmann et al. |
| 6,850,336 B1 * | | 2/2005 | Purvis et al. ............ 358/1.15 |
| 6,856,411 B1 | | 2/2005 | Purvis et al. |
| 6,970,261 B1 * | | 11/2005 | Robles ................... 358/1.15 |
| 7,031,014 B2 * | | 4/2006 | Ohwa ..................... 358/1.18 |
| 7,216,347 B1 * | | 5/2007 | Harrison et al. ............ 718/103 |
| 7,254,355 B2 | | 8/2007 | Sahay |
| 7,302,199 B2 * | | 11/2007 | German et al. ............... 399/82 |
| 7,443,529 B2 * | | 10/2008 | Ferlitsch ................. 358/1.15 |
| 7,619,769 B2 * | | 11/2009 | Lofthus et al. ............ 358/1.16 |
| 2002/0078012 A1 | | 6/2002 | Ryan et al. |
| 2002/0097428 A1 * | | 7/2002 | Ferlitsch ................. 358/1.15 |
| 2002/0103559 A1 | | 8/2002 | Gartstein |
| 2003/0077095 A1 | | 4/2003 | Conrow |
| 2004/0085561 A1 | | 5/2004 | Fromherz |
| 2004/0085562 A1 | | 5/2004 | Fromherz |
| 2004/0088207 A1 | | 5/2004 | Fromherz |
| 2004/0150156 A1 | | 8/2004 | Fromherz et al. |
| 2004/0150158 A1 | | 8/2004 | Biegelsen et al. |
| 2004/0153983 A1 | | 8/2004 | McMillan |
| 2004/0216002 A1 | | 10/2004 | Fromherz et al. |
| 2004/0225391 A1 | | 11/2004 | Fromherz et al. |
| 2004/0225394 A1 | | 11/2004 | Fromherz et al. |
| 2004/0247365 A1 | | 12/2004 | Lofthus et al. |
| 2005/0099649 A1 * | | 5/2005 | Ferlitsch et al. ............ 358/1.15 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/120,589, filed May 3, 2005, Contino.
U.S. Appl. No. 11/102,332, filed Apr. 8, 2005, Hindi, et al.
U.S. Appl. No. 11/137,273, filed May 25, 2005, Anderson, et al., Copy enclosed herewith.
U.S. Appl. No. 11/137,634, filed May 25, 2005, Lofthus, et al., Copy enclosed herewith.
U.S. Appl. No. 11/136,959, filed May 25, 2005, German, et al., Copy enclosed herewith.

* cited by examiner

| | PRINTING ←TIME | | | | | | FINISHING | | | |
|---|---|---|---|---|---|---|---|---|---|---|
| M1 | P1-9 | P1-8 | P2-7 | P2-6 | P2-5 | P1-4 | F1 | P1-3 | P1-2 | P1-1 |
| M2 | P2-9 | P2-8 | P1-7 | P1-6 | P1-5 | P2-4 | F2 | P2-3 | P2-2 | P2-1 |
| M3 | P5-12 P5-11 P5-10 P5-9 P5-8 P5-7 P5-6 P5-5 | | | | P5-4 | P5-3 P5-2 P5-1 | F3 | S P4-5 P4-4 | P4-3 | P4-1 P4-1 |

FIG. 6

SCHEDULING SYSTEM

BACKGROUND

The exemplary embodiment relates to a system for scheduling of processing jobs. It finds particular application in connection with scheduling print jobs in a printing system comprising a plurality of marking engines and will be described with particular reference thereto. However, it will be appreciated that the embodiment finds application in single marking engine printing systems and in other systems in which multiple jobs are scheduled contemporaneously and in particular, where the character of jobs to be processed may adversely impact the processing components or output of the system.

Electronic printing systems typically employ an input terminal which receives images in digital form and conversion electronics for converting the image to image signals or pixels. The printing system may include a scanner for scanning image-bearing documents or be connected to a computer network which supplies the digital images. The signals are stored and are read out successively to a marking engine for formation of the images and transfer of the images to a print medium, such as paper. Printing systems have been developed which employ multiple marking engines for black, process (or full) color, and custom color (single color or monochrome) printing of selected pages within a print job.

With the demands placed on printing systems increasing, printing systems which maintain high outputs over extended periods are desirable. When multiple jobs are to be sequentially printed, a process known as "job streaming" is commonly implemented. Job streaming is the ability of a printing system to complete successive printing jobs with a minimum of delay time between jobs. A control system associated with the printing system identifies that multiple jobs are waiting in a queue, determines their characteristics, and plans the printing of the jobs in sequence, one job at a time. However, some print jobs, such as those involving heavy weight paper, tend to shift the marking engines away from normal operating conditions. These excursions from the mean can cause productivity losses and/or subsystem performance shortfalls and failures. In conventional printing systems which handle heavy weight paper, for example, the printing system may be configured to allow a recovery time by skipping pitches, i.e., leave a gap between sequentially printed sheets equivalent to one or more sheets, when heavy weight paper is to be printed. This reduces excursions from the mean but may also decrease the productivity of the system.

CROSS REFERENCE TO RELATED APPLICATIONS

The following copending applications, the disclosures of which are incorporated by reference in their entireties, are mentioned:

U.S. patent application Ser. No. 11/136,959, filed contemporaneously herewith, entitled PRINTING SYSTEM, by Robert M. Lofthus, et al.;

U.S. patent application Ser. No. 11/137,634, filed contemporaneously herewith, entitled PRINTING SYSTEM, by Kristine A. German, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/953,953, filed Sep. 29, 2004, entitled "CUSTOMIZED SET POINT CONTROL FOR OUTPUT STABILITY (as amended)," by Charles A. Radulski et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards.

REFERENCES

The following references, the disclosures of which are incorporated by reference relate generally to scheduling in a printing system:

U.S. Pat. No. 5,095,369 to Ortiz, et al. discloses a method for enhancing productivity in an electronic printer incorporating finishing activities and operating in a job streaming mode. Printing and collating of sets of original scanned documents are controlled so that collated sets are successively presented by the printer to the finisher nearly coincident with conclusion of the finishing activity being accomplished for a current job. The system uses a predictive algorithm which is used to increase reliability of printer components by cycling down the printer between jobs in situations where the finishing activity for a current job requires an extraordinarily long time to complete compared with the cycle down/cycle up time of the printer.

U.S. Pat. No. 5,701,557 to Webster, et al. describes an image processing apparatus with a controller and plural modules and a method to define a configuration of the image processing machine.

U.S. Pat. No. 6,856,411 to Purvis, et al. discloses a scheduler for picking an itinerary in a printing machine to schedule the processing of sheets through several modules of the printing machine. The scheduler uses hard "must have" policies and soft "desired" policies to select an itinerary.

U.S. Pat. No. 5,696,893 to Fromherz, et al. describes a method for modeling a printing machine specifying a structure model with its physical and software interface and internal resource requirements, and a behavior model to describe capabilities of a component with its description of work units, transformation of work units, timed events, resource allocations, constraints and restrictions.

U.S. application Ser. No. 10/924,458 filed Aug. 23, 2004 entitled PRINT SEQUENCE SCHEDULING FOR RELIABILITY, by Robert M. Lofthus, et al. (A3548-US-NP) discloses a scheduler for a printing system including a plurality of printers which schedules a sequence for printing a plurality of print jobs by the printers based on minimizing printer downtime or maximizing continuous printer run time.

The following references, the disclosures of which are incorporated by reference in their entireties, relate to what have been variously called "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No. 5,489,969 to Soler, et al.; a 1991 "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced."

BRIEF DESCRIPTION

Aspects of the present disclosure in embodiments thereof include a system and a method of printing. In one aspect, the system includes a first processing component which identifies preliminary attributes of print jobs to be printed on sheets. A job scheduler receives the preliminary attributes of a plurality of the print jobs to be printed from the first processing component and assigns each of the jobs to one of a plurality of job queues for printing. The job scheduler has a mode of operation in which the assignment of the print jobs to the job queues is based on the preliminary attributes of the print jobs and on the application of at least one constraint which affects contemporaneous printing of at least two of the print jobs. A second processing component identifies detailed attributes of the print jobs. A sheet scheduler receives information on the assignments of the print jobs and the detailed attributes of the print jobs and forms an itinerary for each sheet to be printed.

In another aspect, a method of printing includes identifying preliminary attributes of a plurality of print jobs to be printed, assigning the print jobs to a plurality of queues based on the identified preliminary attributes, a number of queues corresponding to a maximum number of jobs which a printing system is capable of printing contemporaneously, identifying detailed attributes of the print jobs assigned to the queues, and forming an itinerary for each sheet to be printed based on the detailed attributes of the print jobs.

In another aspect, a printing system includes at least one marking engine for printing pages of print jobs on print media. At least one print media output destination receives printed print media from the at least one marking engine. A scheduling system schedules printing of print jobs on the at least one marking engine. The scheduling system has a mode of operation wherein when at least one of the print jobs comprises pages which tend to place a stress on the printing system when consecutively printed, and wherein the scheduling system applies a latitude model which sets a limit on the extent of printing of the pages which tend to place a stress on the printing system by a marking engine selected from the at least one marking engine before printing at least one page on the marking engine which tends to reduce the stress.

In another aspect, a processing system comprises at least one processing component for processing jobs. At least one output destination receives processed jobs from the at least one marking engine. A scheduling system schedules processing of jobs on the at least one processing component. The scheduling system has a mode of operation in which the scheduling system schedules a plurality of jobs including at least one group of jobs which place a stress on the processing system when performed consecutively, the scheduling system scheduling the jobs such that no more than a predefined number of the jobs which place a stress on the processing system are performed consecutively on one processing component and schedules at least a predetermined minimum number of jobs from a second group of jobs which tend to reduce the stress on the processing system before scheduling any further jobs from the first group of jobs.

BRIEF DESCRIPTION OF THE DRAWINGS

FIG. 6 shows an exemplary print job in progress on the printing system of FIG. 1.

DETAILED DESCRIPTION

Figure 1:
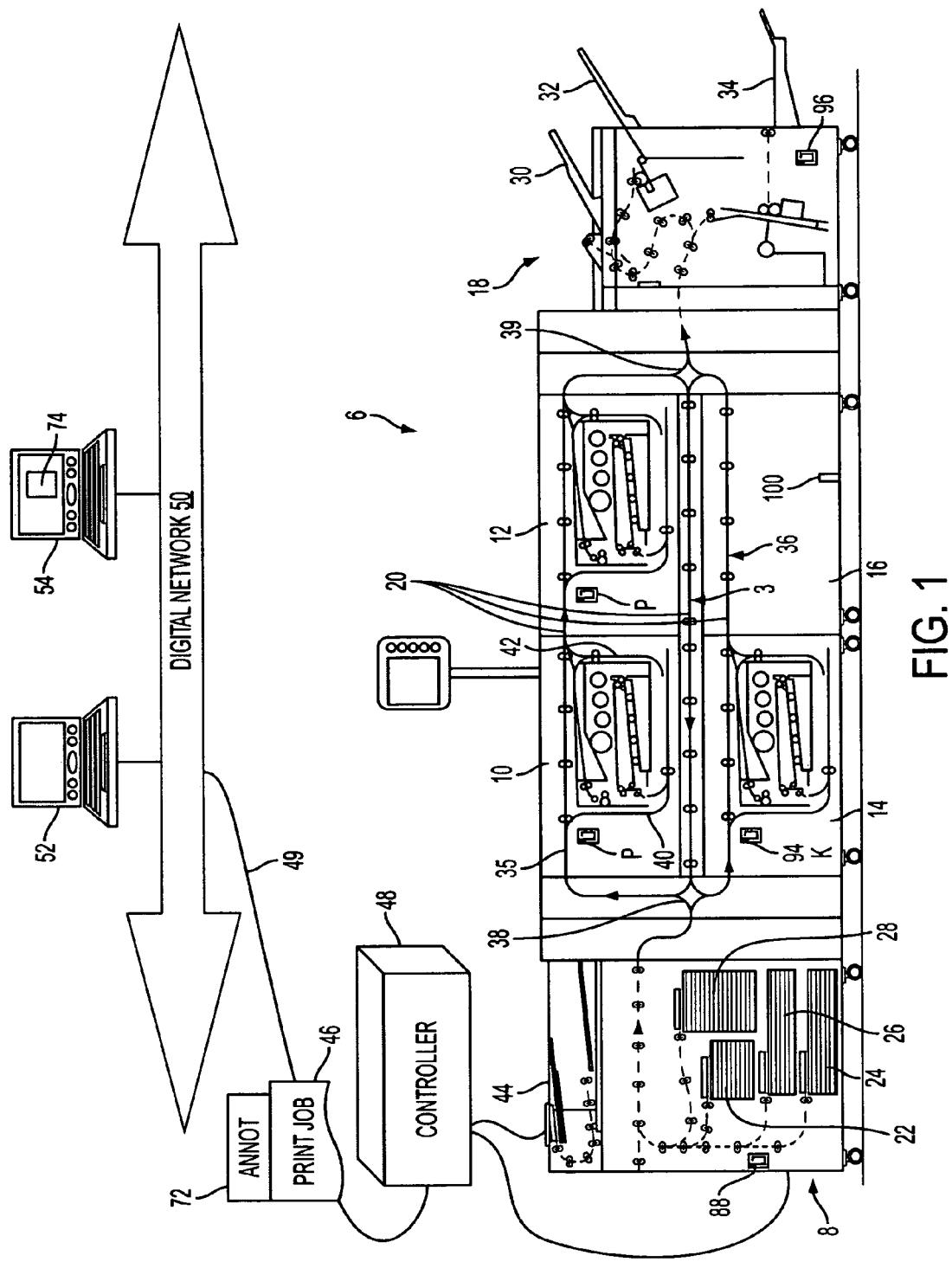
FIG. 1 is a schematic side view of an exemplary printing system.

Aspects of the exemplary embodiment, as disclosed herein, relate to a processing system, such as a printing system. The processing system may include a first processing component which identifies preliminary attributes of jobs, such as print jobs, to be processed, for example, by printing on sheets, and a second processing component which identifies detailed attributes of the jobs, such as the content of each component of the job, e.g., sheet content in the case of a printing system. A scheduling system includes a job scheduler which receives the preliminary attributes of a set of the jobs to be printed or otherwise processed from the processing component and assigns each of the jobs in the set to one of a plurality of job queues. Jobs from the set of jobs which are assigned to different job queues may thus be scheduled to be processed contemporaneously. In general, the number of job queues corresponds to the maximum number of jobs that the printing system is capable of printing contemporaneously, which in turn, is generally limited by the maximum number of output destinations.

In at least one mode of operation, the assignment of the print jobs to the job queues and the order of jobs in the job queues is based on the preliminary attributes of the print jobs and on the application of at least one constraint which limits contemporaneous printing of some of the print jobs. The second processing component is responsive to the job scheduler for prioritizing the identification of the detailed attributes of the set of print jobs based on their positions in the job queue. The scheduling system may also include a component scheduler, such as a sheet scheduler which receives the assignments of the jobs from the job scheduler and forms an itinerary for each component, e.g., sheet to be printed based on the detailed attributes of the print jobs.

Print jobs generally include a plurality of digital "pages" to be rendered as one or more copies on a set of associated sheets of print media, each page, when rendered, constituting the front or back side of a sheet. The pages of a print job may arrive from a common source and, when rendered, be assembled at a common output destination.

In aspects of the exemplary embodiment the job processing system comprises a printing system including a plurality of marking engines, each of which apply a marking material, such as ink or toner, to a print medium, such as sheets of paper, to form images on the print media. The printing system can be a digital copier or printer, bookmaking machine, facsimile machine, multi-function machine, or the like.

The first processing component may be a low resolution decomposer which takes sufficient information from the print jobs for the job scheduler to assign jobs from the multi-job queue among a plurality of queues. More detailed information on the job is obtained by the second processing component (a high resolution decomposer). The high resolution decomposer obtains the information for the sheet scheduler to create itineraries for the sheets to be printed. By separating the functions of the decomposition of the print job in this way, the overall processing time for the jobs can be reduced since the more detailed and time consuming function of obtaining the detailed information on the print jobs can be performed after the jobs have been assigned to the queues and prioritized according to which jobs are to be printed first.

The scheduling system may select jobs from a plurality of print jobs for contemporaneous printing. The number of queues is generally limited to the number of independent output destinations. While it is contemplated that each queue may have its own corresponding output destination, it is not necessary for all the jobs from a particular queue to end up at the same output destination. For example, when two or more jobs are scheduled to arrive at the output destinations at the same time, the output destination previously used for one queue may be exchanged with that of the other queue. In a printing system, the output destinations are usually finishing stations, such as trays or stacks, in which the sheets of a job are assembled in output order. There may be, for example, two, three, four, six, or eight queues and a corresponding number of output destinations. Any print jobs which are scheduled for printing contemporaneously are thus destined for different output destinations.

It is to be appreciated that two jobs which are scheduled to be printed contemporaneously may utilize the same or different marking engines for printing. For example, contemporaneous printing may include interleaving pages of one job with pages of another job on the same marking engine, the interleaved pages being subsequently split into two separate streams for delivering to separate output destinations.

Constraints on the job scheduler are generally those which may limit the range of potential assignments of jobs to job queues. The constraints may be operator-selected constraints, default constraints of the printing system, constraints imposed by the source of the images to be printed, or a combination thereof. Included among exemplary constraints are stress-related constraints relating which promote the contemporaneous scheduling of stress-causing jobs with stress-relieving jobs, described in greater detail below. Other constraints may relate to image quality, for example, constraints which require the use of the same (or an acceptable equivalent) marking engine for printing all color images in a print job so that the appearance of images is consistent to the eye. Such constraints may limit, for example, the extent to which two color marking engines may contemporaneously print portions of the same job, and thus promote scheduling of contemporaneous printing of different color jobs in order to utilize the two marking engines fully. Yet further constraints may relate to job timing, such as constraints on deadlines for printing a job. For example, a print job may be required by a certain time. The scheduling of the priority job may affect the contemporaneous printing of other print jobs to the extent that such contemporaneous printing would prevent the deadline from being met.

Some of the print jobs are considered "normal" print jobs in that the marking engines are able to print the jobs without creating an undue stress on the marking engine, even when multiple jobs of the same type are run in sequence. For these jobs, the marking engine is generally operating under normal operating conditions, i.e., conditions which are well within the latitude limits of the marking engine, such as those which apply the least stress to the marking engine. Other print jobs are considered "stress-causing jobs" in that they can be printed by the printing system but doing so creates a stress on the printing system, generally because the print job is one which causes the marking engine to depart from its normal operating conditions. The degree of stress placed on the marking engine depends on the degree of deviation of the marking engine from its normal operating conditions and the duration of the deviation. Thus, jobs which place little stress on a marking engine if run for a relatively short time may create a stress which causes the marking engine to exceed its latitude limits when run for an extended period. For example, where multiple stress-causing jobs of the same type of stress are run in sequence on the same marking engine a stress can be created.

A stress related constraint on the job scheduler is generally one which is intended to reduce stress on a marking engine or engines by causing the scheduler to schedule, where possible, a stress-relieving job contemporaneously with a stress-causing job. The stress may be one which causes damage to the marking engine if continued for extended periods. For example, xerographic subsystems, such as fusers, may become overheated, resulting in a shortened lifetime. In other aspects, the stress may be one which adversely affects the print job, for example, the quality of the images produced or image permanence. For example, undesirable spots may occur in the images or the images may be poorly tacked to the print media and prone to being dislodged. In another aspect, the stress can be one which causes productivity losses for example, by causing the marking engine to operate at a lower output. Several stresses may be combined. While the stresses will be described with particular reference to marking engines it will be appreciated that other components of a printing system, such as finishers and paper feeders, may suffer stresses which can be addressed through appropriate scheduling of a series of print jobs.

In general, the job scheduler may schedule jobs in the queues to maximize some measure of utility. In a simple model, this may be expressed in terms of the productivity of the printing system. Productivity may be expressed in terms of the overall system, such as the overall prints per minute (ppm) or time for a plurality of jobs in a queue to be completed. Productivity can also be expressed for a marking engine in terms of its output in ppm.

In a more complex model, the job scheduler may consider multiple variables which affect utility, each of which has an assigned "value" and/or "cost." By integrating over time the sum of the costs and values, a measure of the overall utility of a potential assignment of jobs to queues may be made. By repeating this analysis over all the possible assignments of the jobs, the assignment of jobs which provides the highest utility can be identified and selected as the assignment to be realized by the marking engines.

It will be appreciated that the assigned costs and values used in determining a measure of utility of a potential assignment of jobs may vary from the actual costs and values since these may be difficult to determine. However, an estimate can be made which approximates the actual cost. Exemplary values include the value of having a print job printed in terms of revenue for the job (or each page thereof) and may take into account the time at which the job is printed, where there is a time deadline constraint. For example, a job scheduled to be printed after the deadline may be assigned a zero value, and may also be assigned a cost. Other values may take into account the effect on the ability to print subsequent jobs or pages. For example, in a printing system, the pages of a job are printed so as to reach the selected output destination in a time ordered sequence. This means, for most practical purposes, that the pages of the job are printed in a time ordered sequence.

Costs include the costs of printing the page. For example, printing a black page on a color marking engine generally incurs a higher cost than printing on a black marking engine. Accordingly, the scheduling system, in general, will not schedule a job involving all black printing on a color marking engine unless no black marking engine is available and the value associated with productivity exceeds the additional costs. Other costs include the cost of having a marking engine idle, for example when no job is being printed on the marking engine or when the marking engine runs at a lower throughput to accommodate a stress-causing job. Other costs may relate to the stresses placed on the printing system by stress-causing jobs. While in one operational mode, stress-causing jobs place constraints on the scheduling of jobs, there may be an override which allows an operator or the job scheduler to override these constraints. For example, if a job is required urgently, the time value of a job is particularly high and the job scheduler may be instructed to override some or all of the stress-related constraints.

The scheduling system may apply one or more methods for reducing stress which may include:

a) distributing a plurality of stress-causing jobs among multiple marking engines, b) distributing portions of a stress-causing job among multiple marking engines, c) interleaving a stress-causing job or portion thereof with a normal job on the same marking engine;

d) interleaving a first stress-causing job with a second stress-causing job on the same marking engine where the first and second stress-causing jobs generate different stresses, for example, because they affect different xerographic systems of the marking engine or because they have a counteracting effect on the same xerographic subsystem; and e) skipping pitches, in general, this last method is selected as a last resort, where no other stress reducing method is available, since it is likely to be the option having the least benefit on "utility."

Not all the stress-relieving methods a)-d) may be available to the scheduling system at a particular time. For example, where the printing system has only one marking engine which can handle a stress-causing job, the scheduling system does not have the option of distributing portions of a stress-causing job among multiple marking engines. Rather, the scheduling system may select to interleave the stress-causing job with another job on the same marking engine, presuming that there are two output destinations available for receiving the two jobs.

The stress reducing methods may have a priority weighting such that some of the methods are used preferentially. Or, the scheduling system may select the method(s) which best achieve a particular defined goal, such as overall utility of a set of print jobs and/or productivity of the printing system.

One example of stress-causing job is a job which employs a large proportion of heavyweight paper. Heavyweight paper may be considered to be paper which causes one or more of the marking engines to deviate from normal operating conditions. Xerographic subsystems such as a fuser of the marking engine are set up for normal weight paper. Heavier paper absorbs more heat from the fuser than normal paper, which tends to cause the fuser temperature to drop. As a result, images may be improperly fused. In conventional systems, this stress may be reduced by reducing the throughput of the marking engine, giving the fuser time to return to its normal operating temperature between sequential fusing operations. This results in a productivity loss. The exemplary scheduling system recognizes a job or jobs comprising heavyweight paper as being a stress-causing job(s) and may employ one or more of the stress reducing methods discussed above, e.g., schedule such jobs or portions of a job among multiple marking engines, thereby allowing the marking engines a recovery time between heavy weight sheets or between groups of sheets, without needing to skip pitches.

Another example of a stress-causing job is one where the long term average toner consumption per page is low for a monochrome engine or for any color of a process color engine. This typically occurs when a job has a preponderance of low area coverage monochrome pages, or a preponderance of low area coverage images for one or more of the color separations for process color pages. If too low of an average consumption rate for any toner persists for too many pages, the marking materials are not used at a sufficient rate, and the supply is not regularly replenished with fresh material. Over an extended period, the marking material stored in the developer housing becomes damaged due to the constant churning of the material under high shear. Examples of damage are the impaction of toner particles onto carrier beads, the impaction of additives onto toner, or the degradation of carrier bead coatings. Surface charge distribution of materials damaged in the developer housing can become skewed or pathologically abnormal. Images printed with the damaged material will have one or more image defects, such as color imbalances, fine line growth or shrinkage, or high levels of background toner in the nominally white region of a page, which can appear as a color shift or dirt over the entire printable area of the page. The scheduling system recognizes low area coverage jobs as stress-causing jobs and may employ one or more of the stress reducing methods discussed above, e.g., scheduling such jobs or portions of a job among multiple marking engines. Or the scheduling system may schedule two jobs contemporaneously so that the stress-causing job can be interleaved with another job on the same marking engine, such as interleaving the low coverage job with a normal job or a job which creates a different stress on the marking engine, such as a heavyweight paper job. The stress reducing schedule thus allows the marking engines a recovery time between low area coverage sheets or between groups of such sheets without needing to skip pitches.

Stress-relieving jobs can thus be considered to be those jobs which tend to relieve the stress caused by a stress-causing job and can include normal jobs, which do not of themselves causes stress, and stress-causing jobs of category d) above, which, while relieving the stress of the first stress-causing job, also tend to cause stress of themselves. An example of such a situation would be the interleaving of a heavy weight job with a low area coverage job. Both these jobs may serve as both stress-causing jobs but when interleaved, each may serve as a stress-relieving job for the other.

Another example of a stress-causing job is one which uses repetitive printing of sheets with high toner pile heights. Some colors, such as dark brown, result from the combination of several toners and thus create a larger pile height than others. These may absorb more heat from the fuser, resulting in the fuser deviating from its normal operating range. Other examples of stress-causing jobs are those which involve repetitive printing of small sheets, high area coverage sheets, identically bannered sheets, and the like.

The constraints on scheduling may incorporate stored latitude models for each of the marking devices. These stored latitude models may be expressed in terms of the maximum number of pages which a marking engine can print of a particular stress-causing job before employing a stress-relieving method. The maximum number of pages may vary, depending on the stress-causing job and the capabilities of the marking engine, and can be for example, from 1 to about 50, such as 2, 4, 10, or 20 pages. Additionally, the maximum number of pages may be reduced if the marking engine is already in a partially stressed state. Additionally, the stored latitude models may include the number of pages of a particular type of stress-relieving job which will bring the marking engine back to its normal state. The stored latitude models are generally selected to maintain the printing system in a healthy state and ensure that the images produced are of high quality.

The stored latitude models may be applied by the page scheduler in scheduling printing of sheets. The job scheduler need not identify any particular marking engine for performing printing of a job or jobs, or the pages to be printed on any particular marking engine. Exemplary constraints applied by the job scheduler are those which allow the page scheduler subsequently to apply the latitude models by providing that, for example, a stress-relieving job or jobs of at least a minimum number of pages sufficient to meet the latitude limits is/are scheduled for contemporaneous printing with a particular stress-causing job. The constraints on contemporaneous printing applied by the job scheduler thus may identify, for any stress-causing job, the types of stress-relieving jobs which can be selected for contemporaneous printing and the minimum page ratio for each of these types of stress-relieving job. For example, the page ratio may be expressed as N:1, where N is the minimum number of pages of a particular type of stress-relieving job per page of the stress-causing job. N can be for example, from about 0.1 to about 10, and typically from about 0.2 to 1. As an example, for a stress-causing job which uses a certain type of heavy weight paper, the constraint applied by the job scheduler may identify one or more lighter weights of paper and a different page ratio for each. For example, for a print job with a given number of pages of heavy weight paper, the scheduling system may apply the constraint to identify one or more lighter-weight paper jobs which, in total, meet or exceed the page ratios, and schedule these for contemporaneous printing. Where there are several possible combinations of a stress-causing and a stress-relieving job or jobs from which to choose for contemporaneous printing, the scheduling system may use some utility selection criteria, such as overall productivity or a cost/value analysis in selecting the optimum combination. Additionally, where multiple constraints are applied, such as a combination of stress-related constraints, image quality constraints, and timing constraints, some of the possible combinations of stress-relieving and stress-causing jobs may not meet the image quality and timing constraints and thus be rejected by the job scheduler. In some cases, the constraints may result in fewer than the maximum number of jobs being printed contemporaneously, at a particular time, e.g., only one of the queues includes a job scheduled for printing during a particular time period.

In another aspect of the exemplary embodiment, a processing system includes at least one, and in some aspects, a plurality of processing units, such as marking engines, configured for processing jobs, such as print jobs. The processing system is capable of processing a plurality of jobs contemporaneously, i.e., at time periods which overlap. Some of the jobs tend to drive a processing unit away from a normal operating condition, which may create a stress on the processing unit, over time, or lead to reductions in performance and/or productivity. Thus, constraints may be placed on a scheduling system to reduce the risk of such events. The scheduling system reviews jobs to be processed by the job processing system and schedules jobs to reduce or minimize these stresses.

With reference to FIG. 1, an exemplary job processing system 6 in the form of a modular printing system is shown. The processing system includes a print media source 8, a plurality of job processing units 10, 12, 14, 16, and an output destination 18, such as a finisher, all interconnected by a print media conveyor 20. In some embodiments, one or more of the job processing units 10, 12, 14, 16, are removable processing units. For example, in FIG. 1 the functional portion of processing unit 16 is presently removed, leaving only the external housing or mounting fixture through which the print media conveyor 20 passes. In this manner, for example, the functional portion can be removed for repair, or can be replaced to effectuate an upgrade or modification of the printing system 6. The printing system 6 remains operational with the functional portion of the processing unit 16 removed, broken, or otherwise unavailable, albeit with loss of the functionality of the processing unit 16.

In the printing system 6, the presently installed job processing units 10, 12, 14 are marking engines. While three marking engines 10, 12, 14 are illustrated (with the fourth marking engine 16 presently removed) the number of marking engines can be one, two, three, four, five, six, or more. Providing at least two marking engines typically provides enhanced features and capabilities for the printing system, since marking tasks can be distributed amongst the at least two marking engines. Some or all of the marking engines 10, 12, 14 may be identical to provide redundancy or improved productivity through parallel printing. Alternatively or additionally, some or all of the marking engines 10, 12, 14 may be different to provide different capabilities. For example, the marking engines 10, 12 may be multi-color, e.g., process color (P) marking engines, while the marking engine 14 may be a monochrome engine, such as a black (K) marking engine.

The illustrated marking engines 10, 12, 14 employ xerographic printing technology, in which an electrostatic image is formed and coated with a toner material, and then transferred and fused to paper or another print medium by application of heat and/or pressure. However, marking engines employing other printing technologies can be provided as processing units, such as marking engines employing ink jet transfer, thermal impact printing, or the like.

The illustrated print media source 8 is a high capacity feeder which includes print media sources 22, 24, 26, 28, such as trays, which are connected with the print media conveyor 20 to provide selected types of print media to all of the marking engines. While four print media sources are illustrated, the number of print media sources can be one, two, three, four, five, or more. In other embodiments, one or more of the marking engines may include its own dedicated print media source. Each of the print media sources 22, 24, 26, 28 can store sheets of the same type of print medium, or can store different types of print media. The print media can be substantially any type of medium upon which one or more of the marking engines 10, 12, 14 can print, such as: high quality bond paper, lower quality "copy" paper, overhead transparency sheets, high gloss paper, heavy weight paper and card, and the like.

For example, print media source 22 may store a first weight paper such as letter size paper weighing 75 gsm, print media source 24 may store a second weight paper such as letter size paper weighing 90 gsm, print media source 26 may store a third weight paper such as letter size paper weighing 120 gsm, and print media source 28 may store a fourth weight paper or card such as letter size paper weighing 300 gsm.

Depending on the capabilities of the marking devices, these weights may be considered normal or heavyweight. In an exemplary embodiment, the print media in sources 22 and 24 is normal paper for the color marking engines, i.e., the marking engines 10 and 12 can print on these media types under normal operating conditions. The print media in sources 26 and 28 may be stress-causing paper for the color marking engines, i.e., the marking engines 10 and 12 are capable of printing on these media types but this tends to cause the state of the marking engine to deviate from normal.

The print media conveyor 20 is controllable to acquire sheets of a selected print medium from the print media sources 22, 24, 26, 28, transfer each acquired sheet to one or more of the installed marking engines 10, 12, 14 to perform selected marking tasks, and then transfer each sheet to the finisher 18 to perform finishing tasks. The finisher unit 18 includes one or more print media output destinations 30, 32, 34, herein illustrated by trays. While three output destinations 30, 32, 34 are illustrated, the printing system 6 may include one, two, three, four, or more print media output destinations.

The print media conveyor 20 includes a plurality of paper paths and associated drive elements, such as rollers, spherical balls, or air jets, which convey the print media along the paths and may include diverters, inverters, interposers, and the like, as known in the art. The paths may be in the form of loops which allow print media from one marking engine to be delivered to another marking engine for duplex printing (two sided printing) or overprinting (printing on the same side of the sheet). In the illustrated printing system 6, print media which has been printed by one marking engine can be routed to any other marking engine. Additionally, bypass pathways allow one or more of the printers to be bypassed. In other configurations (not shown) the routing may be more limited. In the exemplary embodiment, downstream and upstream highways 35, 36, 37 are connected at ends thereof by four way junctions 38, 39. Branch pathways 40, 42 connect the main downstream highways with respective ones of the marking engines. While the illustrated marking engines are stacked in a two dimensional configuration, it is also contemplated that a linear arrangement may be employed.

In one embodiment, at least one paper source 22, 24, 26, 28 is connected by the conveyor 20 with at least two marking engines of the same type, such as process color marking engines 10 and 12. A print job or jobs employing the paper can be selectively distributed to one or both marking engines 12, 14, of the same type.

The printing system 6 executes print jobs. Print job execution involves printing images, such as selected text, line graphics, photographs, machine ink character recognition (MICR) notation, and the like on front, back, or front and back sides or pages of one or more sheets of paper or other print media. Some sheets may be left completely blank. Some sheets may have both color and monochrome images. Execution of the print job may also involve collating the sheets in a certain order. Still further, the print job may include folding, stapling, punching holes into, or otherwise physically manipulating or binding the sheets. The printing, finishing, paper handing, and other processing operations that can be executed by the printing system 6 are determined by the capabilities of the paper source 8, marking engines 10, 12, 14, and finisher 18 of the printing system 6. These capabilities may increase over time due to addition of new processing units or upgrading of existing processing units. The capabilities may also decrease over time due to failure or removal of one or more processing units, such as the illustrated removed functional portion of processing unit 16.

An image input device supplies the printing system 6 with images to be printed. The image input device can be a built-in optical scanner 44, which can be used to scan a document such as book pages, a stack of printed pages, or the like, to create a digital image of the scanned document that is reproduced by printing operations performed by the printing system 6. Alternatively, a print job 46 can be electronically delivered to a system controller 48 of the printing system 6 via a wired connection 49 to a digital network 50 that interconnects, for example, personal computers 52, 54 or other digital devices. For example, a network user operating word processing software running on the computer 54 may select to print a word processing document on the printing system 6, thus generating the print job 46, or an external scanner (not shown) connected to the network 50 may provide the print job in electronic form. While a wired network connection 49 is illustrated, a wireless network connection or other wireless communication pathway may be used instead or additionally to connect the printing system 6 with the digital network 50 or scanner 44. The digital network 50 can be a local area network such as a wired Ethernet, a wireless local area network (WLAN), the Internet, some combination thereof, or the like. Moreover, it is contemplated that print jobs may be delivered to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration for employing four marking engines 10, 12, 14, 16, buttressed by the media source 8 on one end and by the finisher unit 18 on the other end, other physical layouts can be used, such as an entirely horizontal arrangement, stacking of processing units three or more units high, or the like. Moreover, while in the printing system 6 the marking engines 10, 12, 14, 16 have removable functional portions, in some other embodiments some or all processing units in a system may have non-removable functional portions. It will be appreciated that even if the functional portion is non-removable, the provision of the print media conveyor 20 with bypass paths through each intermediate processing unit enables the processing unit to be taken "off-line" for repair or modification while the remaining processing units of the printing system continue to function as usual.

In some embodiments the printing system may be a cluster of networked or otherwise logically interconnected printers each having its own associated print media source and finishing components.

The plurality of marking engines, 10, 12, 14, 16 feeder trays 22, 24, 26, 28, output destinations 30, 32, 34, and flexible print media conveyor 20 enable the printing system 6 to have a large number of capabilities and features.

Figure 2:
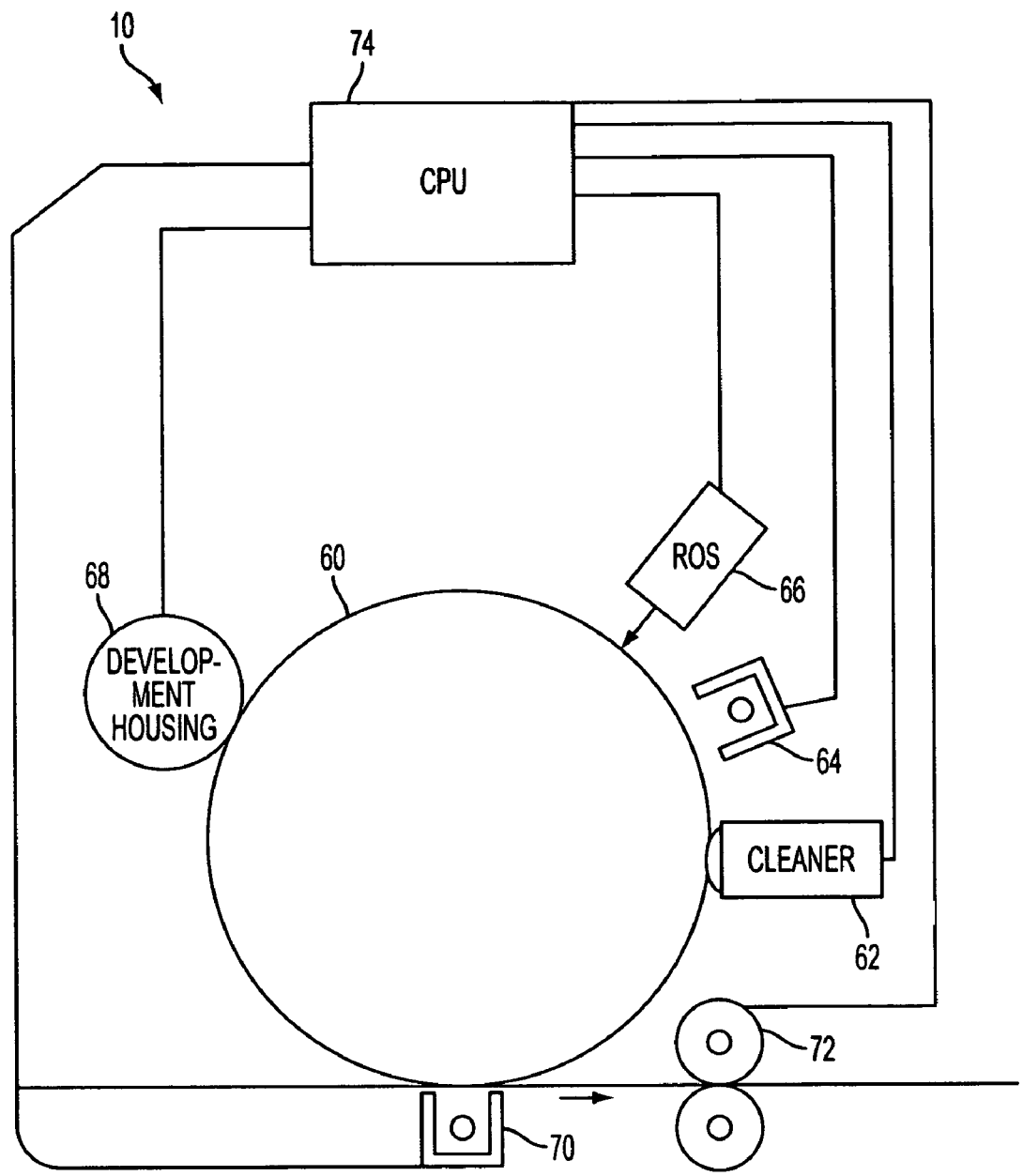
FIG. 2 is a schematic diagram of an exemplary marking engine; is a schematic diagram of the printing system of FIG. 1 illustrating components of a system control.

With reference to FIG. 2, an exemplary marking engine 10 is shown. Marking engines 12, 14, and 16 may be similarly configured. The marking engine includes various xerographic subsystems for forming an image, transferring the image to a sheet of paper, and fusing the image to attach the image more permanently to the print media. In the case of a xerographic device, the marking engine typically includes a charge retentive surface, such as a rotating photoreceptor 60 in the form of a belt or drum. The images are created on a surface of the photoreceptor. Disposed at various points around the circumference of the photoreceptor 60 are the xerographic subsystems, which include a cleaning device generally indicated as 62, a charging station 64 for each of the colors to be applied (one in the case of a monochrome marking engine, four in the case of a CMYK printer), such as a charging corotron, an exposure station 66, which forms a latent image on the photoreceptor, such as a Raster Output Scanner (ROS) or LED bar, a developer unit 68, associated with each charging station 64 for developing the latent image formed on the surface of the photoreceptor by applying a toner to obtain a toner image, a transfer unit 70, such as a transfer corotron, transfers the toner image thus formed to the surface of a print media substrate, such as a sheet of paper, and a fuser 72, which fuses the image to the sheet. The developer unit includes a developer material storage reservoir or sump (not shown) containing a mixture of toner particles (often with surface additives) and magnetic carrier beads (often with surface coatings). The developer material is agitated, e.g., with one or more agitators, such as a blade or other agitator while in the reservoir. The overall agitation is designed to produce an appropriate tribo-electric charge on the toner particles, blend freshly dispensed material into the existing sump supply, and to circulate the developer material between the sump and the development nip. The fuser 72 generally applies at least one of heat and pressure to the sheet to physically attach the toner and optionally to provide a level of gloss to the printed media. In any particular embodiment of an electrophotographic marking engine, there may be variations on this general outline, such as additional corotrons, cleaning devices, or, in the case of a color printer, multiple developer units. The xerographic subsystems 62, 64, 66, 68, 70, and 72 are controlled by a marking engine controller 74 such as a CPU, which includes actuators for controlling each of the subsystems. The marking engine controller 74 is linked to the system controller 48 and may be also linked to other known components, such as a memory, a marking cartridge platform, a marking driver, a function switch, a self-diagnostic unit, all of which can be interconnected by a data/control bus. Each marking engine 10, 12, 14 may have its own marking engine controller 74, 76, 78, as shown in FIG. 1.

Figure 3:
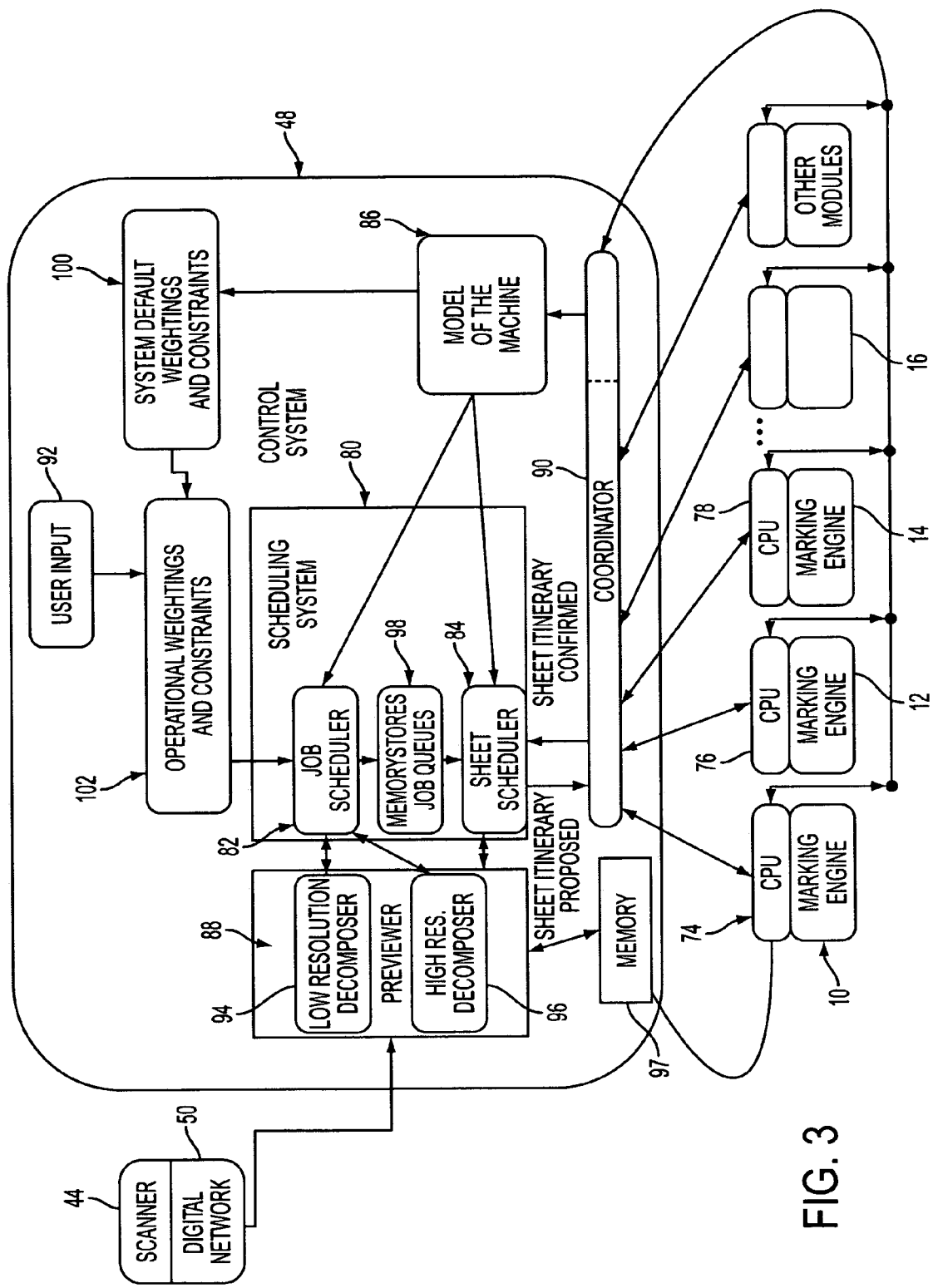
FIG. 3 is a schematic diagram of the printing system of FIG. 1 illustrating components of a system control.

With reference now to FIG. 3, the control system 48 of the printing system will be described in greater detail. The control system 48 includes a scheduling system 80 which includes a first processing component for scheduling jobs, or "job scheduler" 82, and a second processing component for scheduling individual job sheets or "sheet scheduler" 84. Optionally, the functions of the two schedulers 82, 84 may be combined into a single processing component. The scheduling system 80 accesses a model of the machine 86 to obtain information on the printing system for scheduling jobs. A job previewer or digital front end 88 in communication with the image input source (e.g., digital network 50 and/or scanner 44) reviews incoming jobs and sends information on the jobs to the scheduling system 80. A coordinator 90 communicates with the marking engines and other components of the printing system to coordinate the printing of the job including the transportation of the print media to the marking engines and the collation and assembly of print jobs output by the finisher according to the scheduled itinerary. A user input 92 receives user inputs, such as user preferences, which affect job scheduling, and may be connected to a suitable user input device (not shown) such as a keyboard, selector switch or the like.

The model of the machine 86 includes information on functional characteristics (inherent capabilities) of components of the printing system, such as the marking engines 10, 12, 14, 16, paper feeder 8, and finisher 18. For example, the model of the machine 86 includes information on each of the marking engines, such as the type of marking engine (color marking engine, black marking engine), the maximum sheet throughput rate of the marking engine, the types of print media compatible with the marking engine, the current state of the marking engine, and its range of available states, where these can be changed. For example, marking engines 10, 12 may be in a state for printing normal weight print media but can be changed to a state in which they can accept heavy weight paper with an appropriate time delay. The model of the machine 86 may also include information on the types of print media available in print media source 8, and the characteristics of the finisher 18, such as capabilities for stapling, collating, hole-punching, binding, and the like, and other functional characteristics.

The model of the machine 86 also includes stored operational latitude models for stress relief, sustained performance, and productivity, and/or health of the marking engine. For example, one operation latitude model stored in the model of the machine 86 may include the maximum number of sheets of a given type of heavy weight paper that a marking engine may print consecutively before it undergoes a recovery period (typically expressed in terms of one or more skipped pitches) or is used to print a print media which counteracts the stress, such as normal weight paper. The latitude model also includes the number of sheets of the normal paper that the marking engine is to print before the marking engine is permitted to return to printing a heavy weight paper. Similar latitude models can be provided which express limits on the number of sheets that can be printed consecutively which are determined to fall below a predefined average area coverage, and the recovery period or number of sheets of normal or high area coverage (sheets which are determined to be at or above the predefined average area coverage) before printing low area coverage can be resumed. These are intended to be only exemplary of the characteristics of the images and print media which the model of the machine 86 can include. The latitude models can be much more complex, including, for example, the combined effects of print media weight and area coverage.

The flexible reconfigurable architecture allows the scheduling system to simultaneously schedule and assign multiple print jobs to multiple marking engines in order to decrease the adverse effects of stress-causing print jobs on productivity, image quality, and/or components of the printing system. Instead, a stress-causing job or sequence of jobs can be distributed between multiple engines and/or may be intermixed with a stress-relieving print job or jobs or portion(s) thereof. Such approach reduces the short term average excursion from the normal operation of the printing system. As a result, customers are able to print jobs that could not be printed as sequential sheets without compromising the printing system and/or its performance. This is true for both multiple marking engine and single marking engine printing systems. Since multiple jobs arrive at the finisher 18 during the same time period, the finisher has a plurality of output destinations for collecting sequential pages of each print job that is being contemporaneously printed by the system. In general, the number of print jobs that the printing system can print contemporaneously is limited to the number of available output destinations.

The model of the machine 86 is periodically updated with information on the current states of the marking engines 10, 12, 14, 16, feeder 8, and finisher 18 by querying the marking engine CPU 74 (either directly or via the coordinator 90) and similar processing components in the feeder 8, conveyor 20, and finisher 18.

The previewer 88 includes a first processing component or job low resolution decomposer 94 which determines attributes of the print job including, for example, for each job, the total number of pages, the number of pages of each print modality (color, black, etc.) the number of pages to be printed on each substrate weight, optionally the number of pages with an average area coverage of below a minimum threshold, and the like). The previewer 88 may also identify constraints which may already be associated. with the job (e.g., as tags or as a file header), such as time constraints or contemporaneous printing constraints. In general, the low resolution decomposer 94 provides only a coarse analysis (less than all) of the information on the print job which will ultimately be required for printing. Thus, the information can be acquired in a relatively short period of time and forwarded to the job scheduler 82. The low resolution processor extracts information on the job attributes from the image and/or the file header for the job, where the information may be in the form of tags.

The job previewer 88 also includes a second processing component or "high resolution decomposer" 96 which, for each sheet, identifies the content of each page (i.e., front and back of the sheet) in terms of the image content and substrate type, etc. This fine analysis of the job content generally takes much longer than the coarse determination of job attributes. Information generated by the sheet high resolution decomposer is forwarded to the sheet scheduler for scheduling printing of the individual pages of the jobs scheduled for printing by the job scheduler. The previewer 88 assigns an address to the image content of each page. The image content, together with its address is stored in a memory 97, to be accessed later by the marking engine which has been scheduled to print the page. The high resolution decomposer 96 can begin its high level identification of attributes of the print job pages for creation of an assembly tree at the same time or some time after the low resolution decomposer performs the coarse analysis of job attributes. It will be appreciated that the high and low resolution decomposers may be combined into a single processing unit. The assembly tree includes, for each job, the content of each sheet, including the images to appear on each side of the sheet.

The high decomposer 96 alone, or in combination with the low resolution decomposer 94, performs what is commonly known as raster image processing (RIP). In this process, image data representative of an image desired to be printed, which is in a standard format, is converted into "rasterized" data, which can ultimately be sent directly to the marking engines. Further details on raster image processing are described, for example, in U.S. Pat. No. 6,819,445 to Stevenson, et al., the disclosure if which is incorporated herein in pertinent part.

The job scheduler 82 receives the job attributes for a plurality of jobs from the low resolution decomposer and assigns the jobs to a plurality of marking job queues or job streams, which are stored in memory 98. The number of queues will depend on the number of output destinations. Thus, in the illustrated example in FIG. 1, where there are three output destinations, a maximum number of three queues may be formed. In assigning jobs to the queues the job scheduler attempts to produce the best fit of jobs to optimize "utility." In doing so, the job scheduler takes into account the job attributes identified by the low resolution decomposer for each of the jobs and the constraints placed on job scheduling. The positions of the jobs in a particular queue represent the order in which they are to be printed, the first job being printed first, and so forth.

Since the number of jobs may be typically fewer than about 100, in one embodiment, the job scheduler 82 looks at every possible assignment of the low resolution scanned jobs into the available queues and determines the assignment which provides the maximum utility (a combinatorial approach). This assignment is then selected as the actual assignment. Alternatively, the job scheduler may determine the utility for a subset of the jobs in the multi-job queue. For example, the job scheduler may determine the assignment which has the maximum utility for the first fifty jobs in the multi-job queue and assign these fifty jobs to the job queues according to the assignment. The process is repeated for the next fifty jobs, and so forth. In an alternative embodiment, the job scheduler periodically updates the schedule for a fixed number of jobs. For example, the job scheduler schedules the first 50 jobs in the queue. Once a set number of these have been printed, e.g., one, five, or ten jobs, the scheduler reschedules the remaining number of jobs in the first set in combination with an additional number from the queue equivalent to the number printed.

The job scheduler may thus include a) a processing subcomponent which identifies each job with a set of attributes, b) a processing subcomponent which receives constraints placed on potential assignments, c) a processing subcomponent which creates potential assignments of the print jobs into job queues while observing the constraints, d) a processing subcomponent which determines the respective utilities of each of the potential assignments and identifies the assignment with the maximum utility, and stores it to memory 98 as the actual assignment, and a processing subcomponent which communicates information on the actual assignment to the sheet scheduler 84 and to the previewer, specifically, to the high resolution decomposition processor 96. Processing component b) may communicate with the model of the machine 86 to determine constraints to apply. Processing component d) may access the model of the machine 96, or other memory, which stores costs and values to be used in determining the utility of a potential assignment.

For example, in determining the placement of the jobs in the queues, the job scheduler integrates the utility of the assignment in increments of time t between $t_0$ and time $t_f$, where $t_0$ is the time at which printing of the first sheet is to commence, and $t_f$ is the time at which the printing is to be completed. The utility U of the assignment can be determined from the expression:

$$U = \sum_{t=t0}^{t=tf} v - c$$

where v is the incremental value and c is the incremental cost.

In identifying possible assignments, the job scheduler 82 may identify the stress-causing jobs from the jobs in the multi-job queue, such as those jobs which tend to cause a marking engine to deviate from normal operation. Optimum utility is generally achieved when these are matched with a stress-relieving job or jobs for the same time period. The job scheduler identifies groups of jobs which can be printed contemporaneously according to the number of output destinations available. This step may involve accessing the model of the machine 86 to confirm that a proposed queue assignment can be made within the latitude models for the marking engines. The job scheduler 82 does not need to assign the job to a particular marking engine or engines, simply to assign the jobs in a selected order to the available queues. Thus, if an additional job arrives from the low resolution decomposer after the queues have been formed, the jobs still to be printed can be removed from the queues and the job scheduler 82 makes a new assignment of the remaining jobs and the new job(s) to the queues.

The job scheduler 82 thus described schedules the printing of jobs from the queue of possible jobs. The scheduling process may include scheduling two or more jobs contemporaneously to minimize stress while meeting any imposed constraints. It is contemplated that for large jobs, such as those which will occupy all the available marking engines, the job scheduler may assign the print job to one queue and assign no contemporaneous jobs to one or more of the other queues.

When the actual assignment of jobs to the queues is stored, the information on each job's location in a queue is forwarded to the high resolution decomposer 96. The high resolution decomposer can prioritize the order of jobs it reviews according to the order in the queue such that when a print job reaches the front of a queue for printing, the sheet scheduler 84 has obtained all the information required for printing at least the first few pages of the job. For example, the high resolution decomposer RIPs the jobs that are positioned at the front of each queue. Several jobs may be in the process of RIPing at the same time.

The sheet scheduler 84 prepares a proposed itinerary for each page to be printed. The itinerary includes the components of the printing system (feeders, inverters, marking engines, and the like) to be used in printing the sheet and the time at which each component is to perform the task. The itinerary takes into account the latitude models for the components of the printing system which are to be used in printing the sheet (marking engines, finishers, etc.). The itinerary is confirmed with the components. Once all components accept a proposed itinerary, the itinerary becomes the actual itinerary for printing the sheet. In the event that an exception occurs, such as a paper jam, the sheet scheduler 84 may scrap one or more sheet itineraries and implement new ones.

U.S. Published Application Nos. 2004/0085561, 2004/0085567, and 2004/0088207 to Fromherz, published May 6, 2004, which are incorporated herein in their entireties by reference, disclose exemplary scheduling systems suited to use with a reconfigurable printing system. Such a scheduling system may be used to schedule the print sequence herein, by introducing latitude models which reduce stress. The scheduling system and model of the machine may also include features of the scheduler and model of the machine described in U.S. Pat. No. 5,617,214 to Webster, et al., incorporated herein by reference, except as otherwise noted.

Figure 4:
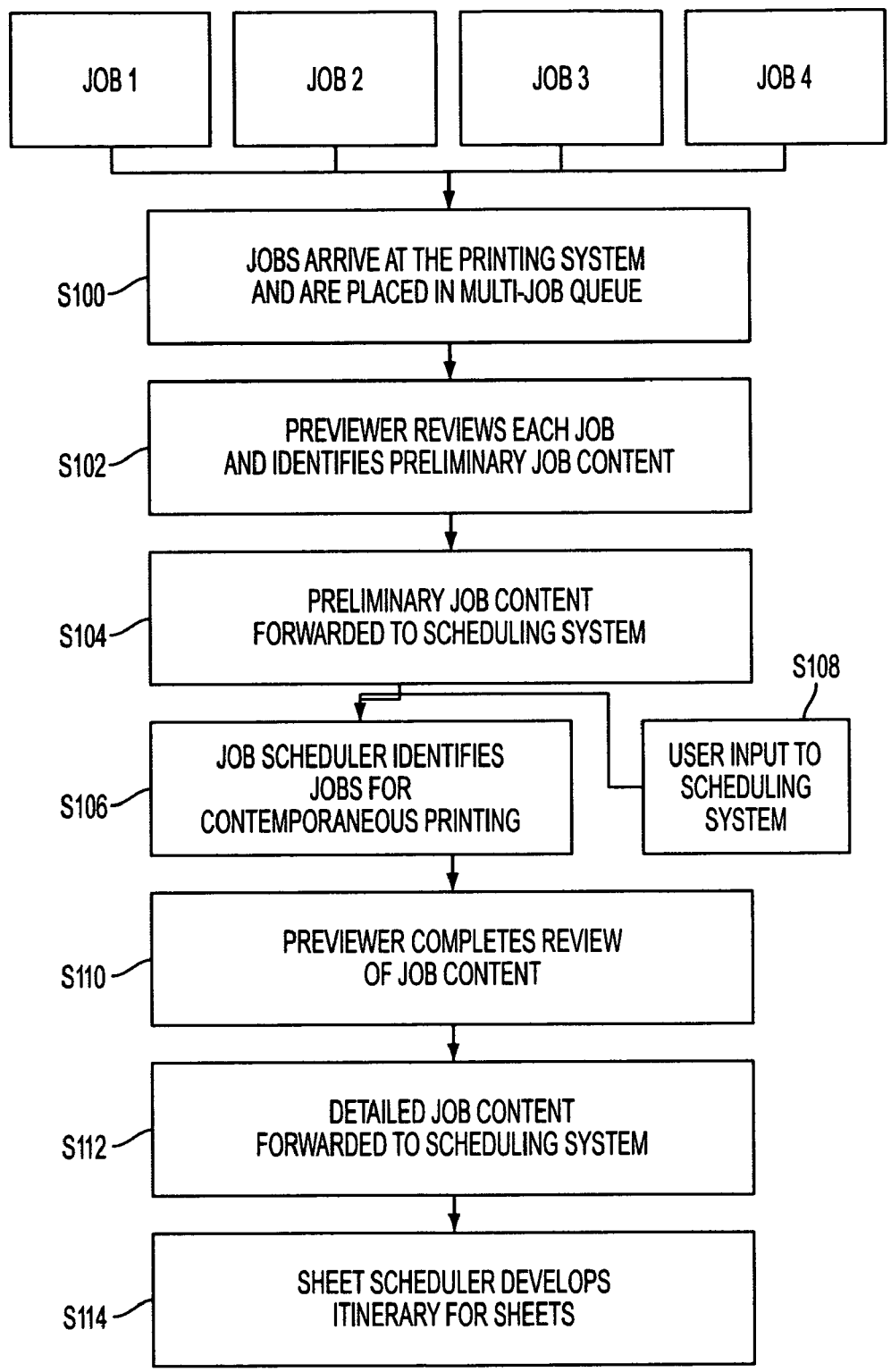
FIG. 4 is a flow chart showing steps in an exemplary scheduling process.

As illustrated in FIG. 4, which is a flow chart for an exemplary printing process, jobs arrive at the printing system and are converted by the printing system or digital network into a digital form which is compatible with the printing system by and are placed in a multi-job queue (Step S100). At step S102, the low resolution decomposer 94 of job previewer 88 reviews the information for each job in the queue and associates a file header with each job. Alternatively, all or a portion of the associated job file header may be generated by the scanner 44, the digital network 50, such as the workstations 52, 54 or other source of information of the content of the job. The job header identifies the job according to the job attributes. As noted above, the job attribute information may include information which enables the scheduling system to identify stress-causing jobs. The file header may thus include, for example, information on the total number of pages in the print job, the number of pages of each print modality, such as the number of pages with color images, the number of pages with black images, the number of pages with both black and color images, and the like. Additionally, the file header may include information on the print media to be used, such as the number of pages to be printed on first, second, third, etc. print media substrates, whereby some of the substrates may be identified by the scheduling system as stress-causing substrates, such as heavy weight paper. The file header information may further include information on the images to be printed, such as the number of pages which are of low area coverage or sufficient information for the job scheduler 82 of scheduling system 80 to identify stress-causing jobs comprising low area coverage pages.

At step S104, the previewer 88 sends information on the job content to the scheduling system 80. The information sent at this stage need not be all the information that the scheduling system 80 will use in planning the printing of the individual pages of the print job. In one embodiment, the information sent in step S104 is sufficient for the scheduling system 80 to identify at least one type of stress-causing print job. The scheduling system 80 receives the headers for a plurality of print jobs in a queue.

At step S106, the job scheduler 82 of the scheduling system identifies groups of jobs which can be printed contemporaneously according to the number of output destinations available, for example, by reviewing all the possible assignments of jobs in the queues and identifying the assignment with the highest utility. In doing so, the job scheduler takes into account constraints. For example, the job scheduler identifies the stress-causing jobs from the jobs in the queue, such as those jobs which tend to cause a marking engine to deviate from normal operation and schedules these contemporaneously with stress-relieving jobs.

If a user preference has been input by a user at step S108, the scheduling system 80 takes the user preference into account as a constraint in determining the schedule. In the illustrated embodiment, the model of the machine 86 stores system default constraints and weightings 100 that include the latitude models. When combined with constraints developed from the user input, these form operational weightings and constraints 102 which are input to the scheduling system 80.

In one embodiment, the user input may place a constraint on scheduling, which limits the number of stress reducing methods that the scheduling system 80 has available to it for reducing stress. For example, a user may input a preference for "high image quality," which places a constraint on the scheduling system such as "all color pages of a print job are to be printed on the same color marking engine." In this case, the scheduling system 80 is constrained to use the same marking engine for a color job, even if it is a heavy weight job. Thus, the scheduling system does not have the option of distributing the print job to two marking engines. The job scheduler identifies what other stress reducing methods are available for reducing stress and may select, in the present example, to interleave a heavyweight job with another job on the same marking engine. U.S. patent application Ser. No. 11/137,634, filed contemporaneously herewith, entitled PRINTING SYSTEM, by Robert M. Lofthus, et al., incorporated herein by reference, describes incorporation of user preferences into a schedule for printing.

In another embodiment, at step S108 the user may input an override, for example for a job which requires immediate printing, in which case the job scheduler 82 arranges for this to be printed before other jobs in the queue.

The information on the print job may be further refined by the previewer 88 at a later stage (Step S110) by including more detailed information about the content of each page. At step S110 (which may begin earlier, at step S102), the previewer 88 creates an assembly tree based on the information provided by the high resolution decomposer 96. The previewer 88 forwards the more detailed information to the scheduling system 80.

At step S114, the sheet scheduling component 84 of the scheduling system schedules the transport and printing of the individual sheets, by creating an itinerary for each sheet. This step may take place as late as a few sheets ahead of printing. The sheet scheduler 84 may use the more detailed information on the print job contents provided by the previewer 88 at step S110. The sheet scheduler 84 may access the model of the machine 86 and/or communicate with the marking engines (e.g., via the coordinator 90) to confirm that a sheet itinerary can be performed by each of the components of the printing system and that the itinerary meets the stress latitude models. Modifications to the contemporaneous scheduling of jobs may be made at this stage if the latitude models cannot be met. Once the proposed itinerary has been accepted by all the printing system components, the components perform whatever tasks are needed to execute the itinerary. The marking engines print the jobs onto the print medium, according to the page itineraries. For example, the assigned marking engine's controller 74, 76, 78 looks at the header information, accesses the memory 97 to obtain the stored image information, and converts the image information into a bitmap for printing.

In another aspect of the exemplary embodiment, the job scheduler 82 sequences jobs and "job packets" in a serial-fashion, where the job packets are first assembled by the job scheduler as outlined below. Each job packet may comprise a plurality of print jobs which may be assigned to a plurality of job queues. The overall sequencing of the jobs and job packets may be determined largely by job priority. However, other objectives, such as achieving productivity or utility may also be considered. The job scheduler then presents the sequenced jobs and job packets to the sheet scheduler 84. Sheets of jobs are scheduled for printing sequentially by the sheet scheduler, whereas sheets in job packets are scheduled alternately from multiple job queues for substantially contemporaneous printing of the jobs within the job packet. Further, "picking rules" can be assigned to a packet to proportion the packet requirements more closely to the system capabilities. For example, for a packet in which jobs are distributed among two job queues, a picking rule such as "pick two sheets from a first queue, followed by one sheet from a second queue; repeat until one queue is empty, then finish the still occupied queue" may be applied by the sheet scheduler.

The job packets may be composed of complementary jobs where at least one of the jobs is a stress-causing job or "outlier" with respect to system capabilities, and the other jobs are selected for contemporaneous printing such that the overall packet composition has better overall alignment with the system capabilities.

The job scheduler assembles the job packets by reviewing the information on the print jobs provided by the previewer from the low resolution decomposition and flagging outliers. The scheduler then scans the available jobs for one or more complementary jobs. Each flagged print job and one or more corresponding complementary jobs are assigned to parallel job queues for contemporaneous printing. Multiple complementary jobs in one queue can be used to roughly match or exceed the estimated active printing time duration of the flagged job in another queue. Additional complementary job queues can be used if there are sufficient output destinations and where the result is an improved system capability alignment. The utility of a packet is determined primarily by how well it matches systems capabilities. However, in general high priority jobs are assigned to different packets from low priority jobs. For each flagged job, criteria may be set for what is an acceptable packet (which need not necessarily be an optimal packet). If any packet does can not meet the criteria, previously formed packets may be reworked, or fall back criteria can be established for passing substandard packets or stand alone flagged jobs. Some of the job packets may include jobs which are neither flagged jobs nor complementary jobs. Job packets may also include jobs which are scheduled for contemporaneous printing along with the flagged and complementary jobs.

The degree to which a print job is considered to be an outlier can depend on the default constraints of the printing system. Alternatively, user selected constraints may impact whether a job is considered to be an outlier. Table 1 lists exemplary outlier and complementary jobs which can be combined into a packet.

TABLE 1

| EXAMPLE JOBS TO BE FLAGGED | POTENTIAL COMPLEMENTARY JOBS FOR A PACKET |
|---|---|
| Extended run monochrome jobs with low average area coverage | monochrome jobs normal to high average area coverage |
| Extended run process color jobs with low average area coverage for a given color separation | Process color jobs with normal to high average area coverage for the same given color separation |
| Extended run monochrome jobs with high average area coverage | monochrome jobs normal to low average area coverage |
| Extended run process color jobs with high average area coverage for a given color separation | Process color jobs with normal to low average area coverage for the same given color separation |
| Predominantly monochrome jobs with repetitive high density areas | predominantly monochrome jobs without high density areas |
| Predominantly process color jobs with repetitive high density areas | predominantly process color jobs without high density areas |
| Jobs with proportionally low number of black pages relative to system capability | jobs with proportionally high number of black pages relative to system capability |
| Jobs with proportionally low number of process color pages relative to system capability | jobs with proportionally high number of process color pages relative to system capability |
| Predominantly monochrome jobs with high image quality requirements | Predominantly monochrome jobs with normal to low image quality requirements for black pages |

TABLE 1-continued

| EXAMPLE JOBS TO BE FLAGGED | POTENTIAL COMPLEMENTARY JOBS FOR A PACKET |
|---|---|
| Predominantly process color jobs with high image quality requirements | Predominantly process color jobs with normal to low image quality requirements |
| Predominantly monochrome jobs with heavy stock | Predominantly monochrome jobs with normal to light weight stock |
| Predominantly process color jobs with heavy stock | Predominantly process color jobs with normal to light weight stock |

The various components of the control system 48, such as the previewer 88, scheduling system 80, and/or model of the machine 86, may be implemented on a general purpose computer or a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the flowchart in FIG. 4 can be used to implement the previewing and scheduling functions. The latitude models may be stored in memory in the form of an algorithm.

The disclosed method may be readily implemented in software using object or object-oriented software development environments that provide portable source code that can be used on a variety of computer or workstation hardware platforms. Alternatively, the disclosed scheduling system may be implemented partially or fully in a hardware using standard logic circuits or VLSI design. Whether software or hardware is used to implement the systems in accordance with the exemplary embodiments is dependent on the speed and/or efficiency requirements of the system, the particular function, and the particular software or hardware systems or microprocessors or microcomputer systems being utilized. The scheduling system and methods described above, however, can be readily implemented in hardware or software using any suitable systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of the exemplary embodiments described herein can be implemented as a routine embedded on a personal computer such as Java® or CGI script, as a resource residing on a server or graphics work station, as a routine embedded in a dedicated print management system, web browser, web TV interface, PDA interface, or the like. The scheduling system can also be implemented by physically incorporating the system and method into a software and/or hardware system, such as the hardware and software of a graphics workstation or dedicated print management system. In one embodiment, the scheduling system can be adapted to use with a variety of different printing systems.

An exemplary job scheduling process will now be described with reference to a plurality of print jobs in which different weights of paper are to be used. In this embodiment, print media sources 22, 24, 26, 28 store letter size paper weighing 75 gsm, 90 gsm, 120 gsm, and 300 gsm, respectively. Color marking engines 10 and 12 are both capable of printing and successfully fusing images on each of these print media. Print media up to 90 gsm can be processed continuously, at the marking engines maximum speed of 35 prints per minute (ppm) without requiring any recovery periods. For heavier sheets, the marking engines can both maintain 35 ppm only by skipping pitches or interspersing lighter sheet printing in between the heavy weight printing. The latitude models in the model of the machine may include the following information, which assumes the fuser is in its normal (optimal) state at the beginning:

a) If paper weight is >90 gsm and <120 gsm, the marking engine 10, 12 can print 4 sheets in succession and will be capable of printing up to four more sheets if the marking engine first:
Skips 1 pitch, or
Prints at least two sheets which are 75 gsm (or less), or
Prints at least three sheets which are 90 gsm (or less).

b) If paperweight is >120 gsm and <400 gsm, the marking engine 10, 12 can print 4 sheets in succession and will be capable of printing up to 4 more sheets if the marking engine first:
Skips 2 pitches, or
Prints at least three sheets which are 75 gsm (or less), or
Prints at least four sheets which are 90 gsm (or less).

It will be appreciated that the page scheduler 84 may select to print fewer than the maximum number of stress-causing pages before printing stress-relieving pages, for example, to achieve a higher productivity. Thus, there may be latitude models for determining a lesser number of stress-relieving pages for such instances. Additionally, the scheduling system may be permitted to print fewer than the minimum number of stress-relieving pages before returning to a stress-causing job. In this case, the latitude models may further include models which define the maximum number of pages which can be printed starting from a state of partial stress.

Similar latitude models are provided for the black marking engine, which may for example, print at a maximum speed of 70 ppm.

Figure 5:
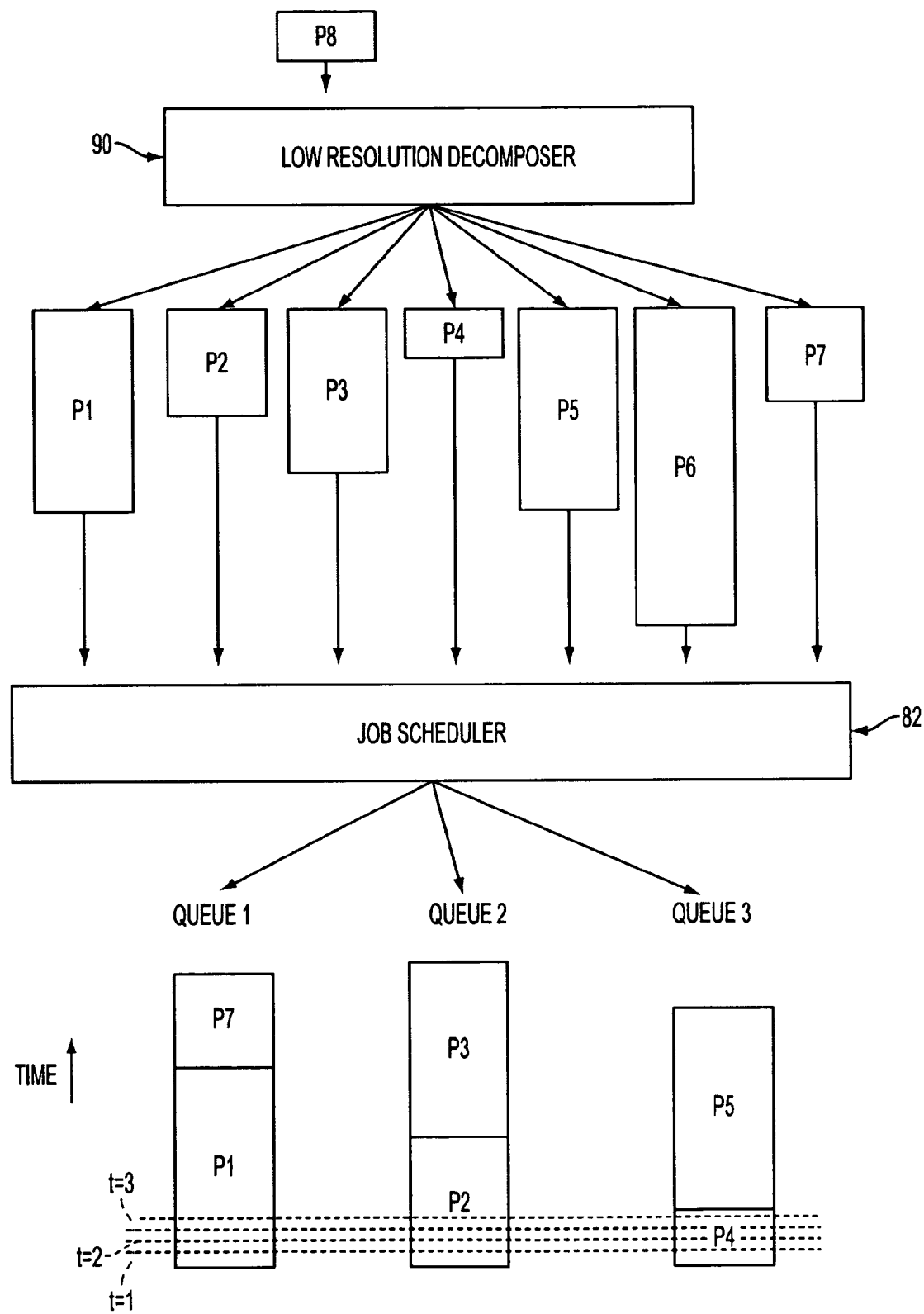
FIG. 5 shows an exemplary multi-job queue being split into job streams.

Assume that a plurality of print jobs arrives at the printing system 6 of FIG. 1. Since the printing system has three finishing stations 30, 32, 34, it can perform up to three print jobs contemporaneously. As illustrated in FIG. 5, the print jobs reach the job scheduler of the scheduling system where they form a queue, as follows:

Print job P1: 50 pages of simplex process color printing on 300 gsm sheets

Print job P2: 20 pages of simplex process color printing on 75 gsm sheets

Print job P3: 40 pages of simplex process color printing on 120 gsm sheets

Print job P4: 5 pages of simplex black printing on 75 gsm sheets

Print job P5: 50 pages of simplex black printing on 75 gsm sheets.

Print job P6: 100 pages of simplex black printing on 75 gsm sheets

Print job P7: 50 pages of simplex process color printing 300 gsm sheets, etc. . . . .

Print job P8 is still in the previewer and will arrive shortly at the job scheduler.

The job scheduler 82 of the scheduling system 80 recognizes that the print job P1 will place stress on the printing system unless interspersed with other jobs. The scheduling system identifies two other process color print jobs P2 and P3, which can be interspersed with job P1 and identifies that both color marking engines are able to print job P1. Print jobs P1, P2, P4, and P5 are combined into a packet for printing.

FIG. 5 shows a stream of jobs leaving the job scheduler in three queues, Queue 1, Queue 2, and Queue 3, one destined for each of the output destinations. Print jobs P1, P2, and P4 are scheduled to be printed first, respectively followed by jobs P7, P3 and P5. Time t=1, t=2, t=3, etc demonstrate exemplary increments of time used by the job scheduler in determining the utility U of the overall assignment. The job order information is forwarded to the high resolution decomposer 96, which prioritizes the RI Ping and assembly tree building for jobs P1, P2, and P4.

This information is also forwarded to the page scheduler 82, which schedules sheets for printing, starting with the first few pages of each of the jobs P1, P2, and P4, as soon as the assembly tree and detailed information on these sheets arrives from the high resolution decomposer 96.

FIG. 6 illustrates an exemplary portion of the print job in progress. The pages are labeled in sequence, page P1-1 being the first page of print job P1, page P1-2 the second page, and so forth. M1 and M2 are the first and second color marking engines 10, 12, M3 is the black marking engine 14 and F1, F2, F3 are the output destinations 30, 32, 34 in the finisher. At the stage illustrated, sheets comprising P1-1, P1-2, P1-3, are already at finisher F1, having been printed by marking engine M1, while sheets comprising pages P2-1, P2-2, P2-3, are at finisher F2, having been printed by marking engine M2. At this point, marking engine M1 is scheduled to print one more of the heavy weight pages and then move to printing on the lighter weight paper, by printing a portion of job P2. Marking engine M2 is scheduled to print another light weight page P24 before moving over to printing pages on heavy weight paper. Job P4 has been completed and is stacked in the finisher F3 with a separator, such as a blank sheet. Job P5 is commencing on marking engine M3. Because there are only three output destinations 30, 32, 34 in this embodiment, job P3 is scheduled to begin once the print job P2 is finished and will be interspersed with the remains of job P1 on marking engines M1 and M2. Other print jobs in the queue are scheduled to be printed, and need not be printed in the order in which they arrive in the queue.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
a first processing component which identifies preliminary attributes of print jobs to be printed on sheets;
a job scheduler which receives the preliminary attributes of a plurality of print jobs to be printed from the first processing component and assigns each of the print jobs to one of a plurality of job queues in time order for printing based on the preliminary attributes, whereby print jobs spanning the same time are scheduled for printing contemporaneously, the job scheduler having a mode of operation in which the assignment of the print jobs to the job queues is based on the preliminary attributes of the print jobs and on the application of at least one constraint which affects contemporaneous printing of at least two of the plurality of print jobs, the application of the at least one constraint comprising applying a latitude model for a stress-causing job which sets a limit on the extent of printing of the pages which tend to place a stress on the printing system, whereby the job scheduler schedules a stress-relieving job for contemporaneous printing by interspersing the stress-relieving job with the stress-causing job;
a second processing component which identifies detailed attributes of the print jobs in the print queues; and
a sheet scheduler which receives information on the assignments of the print jobs to the job queues and the detailed attributes of the print jobs and forms an itinerary for each sheet to be printed.

2. The system of claim 1, further comprising:
a plurality of marking engines in communication with the sheet scheduler for printing sheets according to their itineraries.

3. The system of claim 2, further comprising:
a plurality of output destinations for receiving printed jobs from the marking engines, a number of job queues in the plurality of job queues being no greater than a number of output destinations in the plurality of output destinations.

4. The system of claim 2, further comprising:
a conveyor system which conveys printed sheets between the marking engines and the output destinations.

5. The system of claim 4, wherein the conveyor system conveys printed sheets between a first of the marking engines and a plurality of the output destinations.

6. The system of claim 1, wherein the preliminary attributes include at least one of the group consisting of image attributes, print media attributes, and marking material attributes.

7. The system of claim 6, wherein:
the image attributes include, for each print modality, the number of pages of each print modality;
the print media attributes include, for each of a plurality of different types of print media, the number of pages of the job to be printed on each type of print media; and
the marking material attributes include one or more of marking material area coverage and toner pile height.

8. The system of claim 6, wherein the sheet scheduler forms the itineraries in an order which is based on the locations of the jobs in the queues.

9. The system of claim 1, wherein the preliminary attributes include attributes which enable the job scheduler to identify stress-causing jobs which tend to place a stress on a printing system and stress-relieving jobs which tend to relieve stress placed on the printing system by a stress-causing job, whereby in the mode of operation, whereby the job scheduler schedules a stress-relieving job for printing contemporaneously with a stress-causing job.

10. The system of claim 1, wherein the second processing component is responsive to the job scheduler for prioritizing the identification of the detailed attributes of the set of print jobs based on their locations in the job queues.

11. The system of claim 1, further comprising:

memory which stores a plurality of latitude models, each of the latitude models comprising a limit on the number of pages of a print job which tend to cause stress which are permitted to be printed on a first marking engine before a minimum number of pages of a job which tends to relieve stress are printed on the first marking engine, the memory being accessible to the sheet scheduler.

12. The system of claim 1, wherein in the mode of operation, a plurality of print jobs is scheduled to be printed contemporaneously.

13. The system of claim 1, wherein the job queues to which the print jobs are assigned are no greater in number than a number of output destinations available for the print jobs.

14. The system of claim 1, wherein job queues to which the print jobs are assigned are no greater in number than a maximum number of jobs which are to be scheduled to be printed contemporaneously.

* * * * *